Oct. 2, 1934. F. E. KEY 1,975,580
CONNECTING DEVICE FOR FLANGED OR UPSET TUBES
Filed Nov. 27, 1931  2 Sheets-Sheet 2

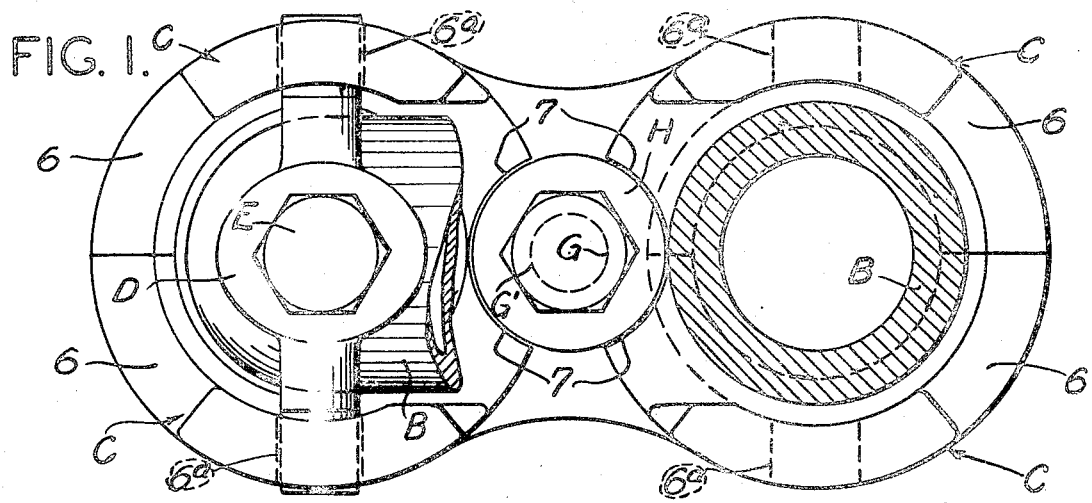
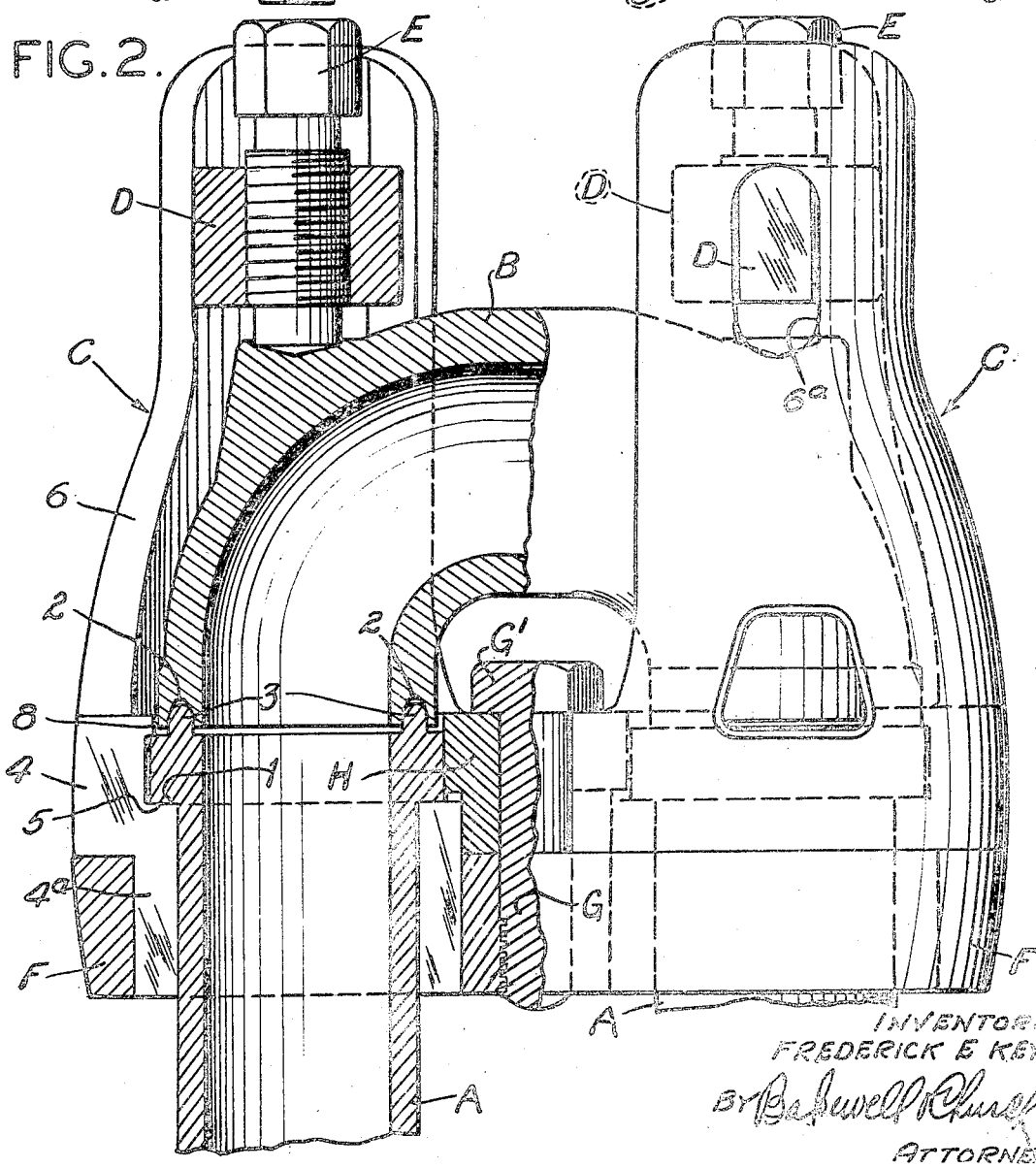

INVENTOR:
FREDERICK E. KEY.
BY Bakewell & Church
ATTORNEYS

Patented Oct. 2, 1934

1,975,580

UNITED STATES PATENT OFFICE 1,975,580

CONNECTING DEVICE FOR FLANGED OR UPSET TUBES

Frederick E. Key, St. Louis, Mo., assignor to Key Boiler Equipment Company, East St. Louis, Ill., a corporation of Missouri Application November 27, 1931, Serial No. 577,528

21 Claims. (Cl. 285—20)

This invention relates to devices of the kind that are used for connecting or joining tubes provided with flanges or upset ends, and particularly, tube connecting devices of the type that are used extensively in oil cracking stills and similar structures and which consist of a removable tubular element for establishing communication between the ends of two tubes, a housing mounted on the end portions of the tubes that project beyond the tube sheet in which the tubes are positioned, and a retaining means for said removable tubular element carried by the housing and constructed so that when it is actuated or tightened to secure said tubular element, said element will be forced in one direction into tight engagement with the ends of the tubes and the housing will be moved endwise of the tubes in the opposite direction so as to produce tight joints between external shoulders on the tubes and portions of the housing that surround the tubes.

One object of my present invention is to provide a tube connecting device of the general type referred to which is of such construction that the tubular element of the device may be removed or disassembled from the tubes to facilitate cleaning of the tubes, without liability of any parts of the structure dropping out of position or moving out of co-acting relationship with the external shoulders on the tubes, and without liability of the tubes spreading or twisting.

Another object is to provide a tube connecting device of the type mentioned, which is of such design that there is no liability of carbon or other foreign matter becoming deposited between the external shoulders on the tubes and the opposed parts of the structure, when the tubular element of the device is removed or not in operative position.

Another object is to provide a tube connecting device of the type mentioned, in which the plates that carry the binding screws which hold the tubular element in engagement with the ends of the tubes, are so designed that they effectively prevent spreading of the extensions or portions on the housing in which said plates are positioned.

And still another object is to provide a connecting device for upset or flanged tubes, which, in addition to having the desirable characteristics and structural features above referred to, is of such design that the co-acting parts of the structure will not be strained and absolutely tight joints between said parts will be produced when the binding screws for the tubular element are tightened, even though the ends of the tubes do not lie in the same plane, and even though there are slight variations in size or inaccuracies in machining in the tube surrounding portions of the housing and the external shoulders on the tubes. Other objects and desirable features of my invention will be hereinafter pointed out.

I have herein illustrated my invention embodied in a tube connecting device of the kind commonly referred to as "return bend fittings", but I wish it to be understood that many features of my present invention are applicable to tube connecting devices that are used to join two tubes disposed at an angle to each other.

Fig. 1 of the drawings is a top plan view, partly broken away, of my improved tube connecting device.

Fig. 2 is a side elevational view of said device, partly broken away.

Figure 3:
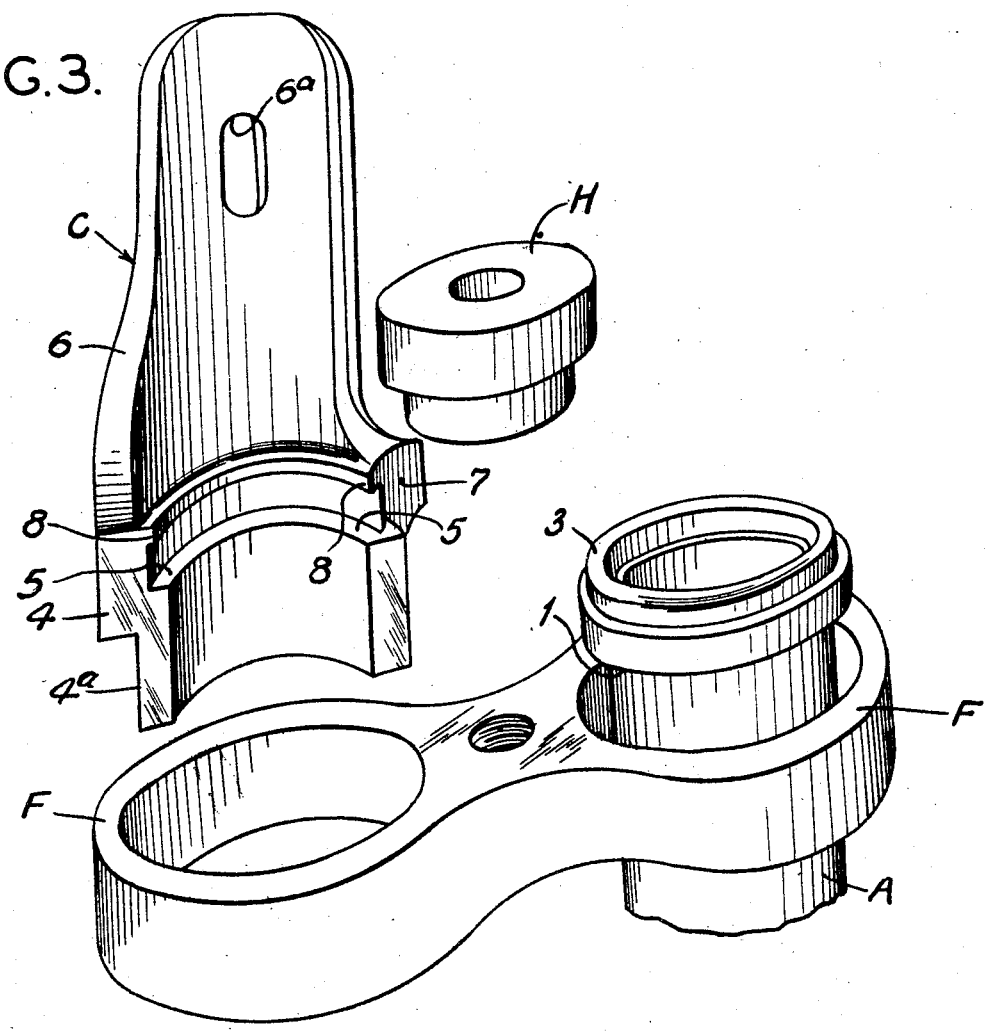
Fig. 3 is a perspective view of some of the parts of the device, showing said parts disassembled so as to more clearly illustrate the construction of the device.
Figure 4:
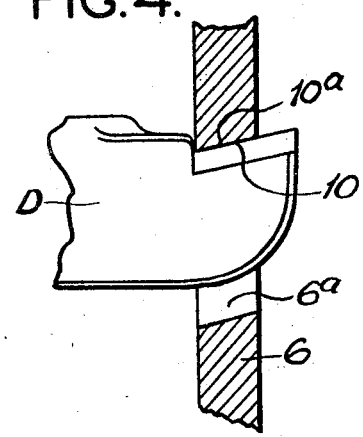
Fig. 4 is a fragmentary sectional view, illustrating how the supporting plates for the binding screws are constructed so as to prevent spreading of the arms or portions of the housing in which said plates are positioned.

In the accompanying drawings which illustrate the preferred form of my invention, A designates a pair of tubes disposed in parallel relationship and having their end portions upset, flanged or otherwise constructed so as to produce external shoulders 1 that project laterally from the outer surfaces of the tubes. The tubes A are joined together by a removable tubular element B of substantially U-shape in general form, whose end portions are shaped so as to co-act with the terminal ends of the tubes to produce tight joints between said parts. In Fig. 2 the tubular element B is illustrated as being provided at its ends with annular recesses 2 that are adapted to receive annular ribs 3 on the terminal ends of the tubes, but I wish it to be understood that it is immaterial, so far as my invention is concerned, what type or kind of co-acting surfaces are formed on the tubular element B and on the terminal ends of the tubes, so long as said surfaces are capable of producing joints that will remain tight under the conditions to which the structure is subjected when in normal or ordinary use.

A housing is mounted on the portions of the tubes A that project beyond the tube sheet (not shown), in which the tubes are positioned, so as to serve as a support for an adjustable retaining means that is adapted to be manipulated or tightened so as to produce tight joints between the tubular element B and the ends of the tubes and between the external shoulders 1 on the tubes and the portions of the housing which surround the tubes. In my improved connecting device the housing just referred to is constructed in such a manner that the structure is easy to assemble or disassemble, and when the tubular element B is removed or disassociated from the tubes, there is no liability of any parts of the structure dropping out of position; there is no liability of the housing shifting endwise of the tubes into an incorrect position; there is no liability of the tubes spreading or twisting and there is no liability of carbon or other foreign matter becoming deposited between the external shoulders on the tubes and the opposed portions of the structure, and thus causing leaky joints or interfering with the proper re-assembling of the parts of the structure when the tubular element B is thereafter arranged in operative engagement with the tubes.

In my improved connecting device the housing comprises two main parts or shackles C, each of which is made up of a plurality of longitudinally-divided sections that can be easily applied to or removed from the tube with which it co-operates. Usually, each of the shackles C will consist of two sections provided with segmental-shaped parts 4 that surround the tube and which are provided with integral shoulders 5 that are adapted to bear against the external shoulder 1 on the tube. Each section of the shackle is also provided with an integral extension or arm 6 that is used to support or guide one end of a removable plate D which carries a binding screw E that serves as a retaining means for the tubular element B. When the two parts of the shackle are assembled the segmental parts 4 of same constitute a tube surrounding portion having an integral shoulder 5 that is drawn into tight engagement with the shoulder 1 on the tube when the binding screw E is tightened, and the extensions on the sections of the shackle constitute a pair of arms that embrace one end portion of the tubular element B and which prevent the binding screw supporting plate D from twisting when the binding screw E is tightened to force the tubular element B into tight engagement with the terminal end of the tube which the shackle surrounds.

The two shackles or main parts C of the housing are tied together by a transversely-disposed tie member F, formed preferably from a bar provided with holes that receive reduced portions 4a at the inner ends of the shackles, said tie bar also operating to prevent the respective sections of the shackles from separating. The tie bar F is held in operative relationship with the shackles C preferably by means of a removable bolt G or screw that is screwed into the tie bar and which is provided with an enlarged head G' or with an adapter H, as hereinafter described, that engages or laps over portions of the two shackles. In order to compensate for slight variations in relative position, in size or in machining of the opposed or co-acting surfaces that are drawn into tight engagement with each other when the binding screws E are tightened, I prefer to construct the housing so that the two main parts or shackles C of same are capable of moving endwise or longitudinally relatively to each other sufficiently to compensate for such variations and produce tight joints between the co-acting parts of the structure without liability of straining said parts when the binding screws E are tightened. In the form of my invention herein illustrated this highly desirable result is attained by mounting the shackles C in the tie member F in such a way that after the shoulder 5 on the tube surrounding portion of one shackle has been drawn into tight engagement with its co-acting tube shoulder 1, the other shackle is capable of moving endwise when its binding screw E is tightened, sufficiently to produce an absolutely tight joint between its shoulder 5 and the opposed shoulder on the tube, even though the opposed surfaces on said other shackle and on the tube shoulder and tie bar F are not machined absolutely the same as the co-acting surfaces of the shackle whose binding screw was first tightened. In other words, if there are slight inaccuracies or variations in opposed surfaces of the structure which would tend to cause the tubular element B to be strained, or tend to cause the housing to not seat tightly on the tube shoulders if the housing were formed in one piece, the slight longitudinal movement that is permitted between the two shackles or main parts C of the housing eliminates any possibility of the tubular element B being strained and insures absolutely tight joints between the housing and the shoulders 1 on the tubes. It will, of course, be understood that the relative endwise play or longitudinal movement of the two shackles is very slight. In fact, in a structure of the kind herein illustrated a clearance of one-eighth of an inch between the adapter H and the portions of the shackles which it overlaps is sufficient to attain the result just described.

Owing to the fact that the reduced portions 4a of the shackles are of cylindrical shape and are arranged in round holes formed in the tie member F, it is necessary to provide some means to prevent the shackles from twisting or turning when the tubular member B is removed or not in operative position. Various means may be used for this purpose, but I prefer to form curved abutment walls 7 on the tube surrounding portions 4 of the shackles (see Fig. 1) at such a point that when the parts of the structure are assembled, the shank of the bolt G or the adapter H that is mounted on said shank will be positioned in said recesses 7, and thus securely hold the shackles against rotation or against twisting, the bolt G or the adapter H forming in effect a key between the shackles that does not interfere with the relative movement of the shackles, but which effectively prevents the shackles from twisting and turning relatively to each other or relatively to the tie member F. The part H previously referred to as an adapter is not used in instances where the tubes A are arranged very close together, for in a connecting device for closely spaced tubes the shackles C are so close together that the head G' of the bolt G will overlap the tube surrounding portions 4 of the shackle and the shank of the bolt will lie in the recesses 7 formed in the meeting sides of said tube surrounding portions. However, if the tubes A joined by the device are spaced relatively far apart, it is necessary to mount a cylindrical-shaped member H, referred to as an adapter, on the shank of the bolt G, so as to serve as a key between the shackles and permitting the shackles to have a slight longitudinal movement relatively to each other.

2. A connecting device for flanged or upset tubes, comprising a removable tubular element for establishing communication between two tubes, a housing mounted on the tubes and made up of two main parts or shackles, each of which comprises a plurality of longitudinally-divided sections that surround one tube and embrace one end portion of said tubular element, integral shoulders on the shackle sections that bear against external shoulders on the tubes, a retaining means for the tubular element carried by the shackles and adapted to be tightened so as to draw the shoulders on the shackles into engagement with the shoulders on the tubes and also force the tubular element into contact with the terminal ends of the tubes, a transversely-disposed tie member in which the shackles are mounted in such a way that the sections of the shackles are prevented from separating but the two shackles are capable of a slight longitudinal movement relatively to each other, and means for preventing the shackles from twisting.

3. A connecting device for flanged or upset tubes, comprising a removable tubular element for establishing communication between two tubes, a housing mounted on the tubes and made up of two main parts or shackles, each of which comprises a plurality of longitudinally-divided sections that surround one tube and embrace one end portion of said tubular element, integral shoulders on the shackle sections that bear against external shoulders on the tubes, a retaining means for the tubular element carried by the shackles and adapted to be tightened so as to draw the shoulders on the shackles into engagement with the shoulders on the tubes and also force the tubular element into contact with the terminal ends of the tubes, a transversely-disposed tie member in which the shackles are mounted in such a way that the sections of the shackles are prevented from separating but the two shackles are capable of a slight longitudinal movement relatively to each other, and a means that limits the relative endwise movement of the shackles and also prevents the shackles from twisting relatively to each other.

4. A connecting device for flanged or upset tubes, comprising a removable tubular element for establishing communication between two tubes, a housing mounted on the tubes and made up of two main parts or shackles, each of which comprises a plurality of longitudinally-divided sections that surround one tube and embrace one end portion of said tubular element, integral shoulders on the shackle sections that bear against external shoulders on the tubes, a retaining means for the tubular element adapted to be actuated to force shoulders on the shackles into engagement with the shoulders on the tubes and also force the tubular element into contact with the terminal ends of the tubes, a transversely-disposed tie member in which the shackles are mounted in such a way that the sections of the shackles are prevented from separating but the two shackles are capable of a slight longitudinal movement relatively to each other, and a means that holds the tie member in assembled relationship with the shackles and also prevents the shackles from twisting.

5. In a tubular structure, the combination of two tubes provided with external shoulders, a removable tubular element for establishing communication between said tubes, a longitudinally split shackle mounted on each tube and provided with a surface that is adapted to bear against the shoulder on the tube, a tie member arranged transversely of the tubes and provided with holes that receive reduced portions at the inner ends of the shackles, integral extensions or side arms on the shackles provided with elongated slots, members in said slots provided with binding screws that hold said tubular element in engagement with the ends of the tubes, and co-acting surfaces on the shackles and on the tubes for preventing the shackles from shifting longitudinally of the tubes when said tubular element is removed.

6. A tube connecting device of the kind described in claim 5, in which the tie member is provided with means that holds the tie member in operative relationship with the shackles and prevents the shackles from twisting when said connecting element is removed.

7. A tube connecting device comprising a removable tubular element for establishing communication between two tubes, a housing mounted on the tubes, devices in connection with said housing for holding said tubular element in position to establish communication between said two tubes, a tie bar engaging and holding said housing in cooperative relation to said tubes, and a device detachably engaging said housing and said tie bar and holding said tie bar in engagement with said housing and preventing said housing from twisting with respect to said tubes.

8. A tube connecting device comprising a tubular element for establishing communication between two tubes, a housing mounted on the tubes and composed of two separate and distinct main parts or shackles, each of which comprises a sectional tube surrounding portion divided longitudinally and engaging a shoulder on the tube which said portion surrounds, a tie bar holding said tubes from spreading apart, and a device connected with said tie bar preventing said housing parts from twisting with respect to said tubes.

9. A tube connecting device for tubes comprising a tubular element having sealing contact with said tubes, housing members engaging said tubes, devices in connection with said housing members for holding said tubular element in sealing contact with said tubes in position to provide communication between said tubes, a member engaging and holding said housing members in engagement with said tubes, and means connected with said last named member engaging and holding said housing members from twisting with respect to said tubes.

10. A device for establishing communication between two tubes comprising a tubular element having its ends in sealing engagement with said tubes respectively, unattached housing members mounted on said tubes, devices in connection with said housing members for holding said tubular element in sealing contact with said two tubes, an element detachably connecting and holding said housing members in connection with said tubes, and a device connected with said element engaging and holding said element in connection with said housing members and also holding said housing members from twisting with respect to said tubes.

11. A device for establishing communication between two adjacent approximately parallel tubes comprising a tubular element having its ends in sealing engagement with the ends of said tubes respectively, unattached housing members shackles and as a stop which limits the relative endwise movement of the shackles. One advantage of my improved tube connecting device is that it may be used for joining tubes that are spaced different distances apart simply by substituting a tie bar having differently spaced holes or openings for receiving the reduced portions 4ª of the shackles.

Figure 5:
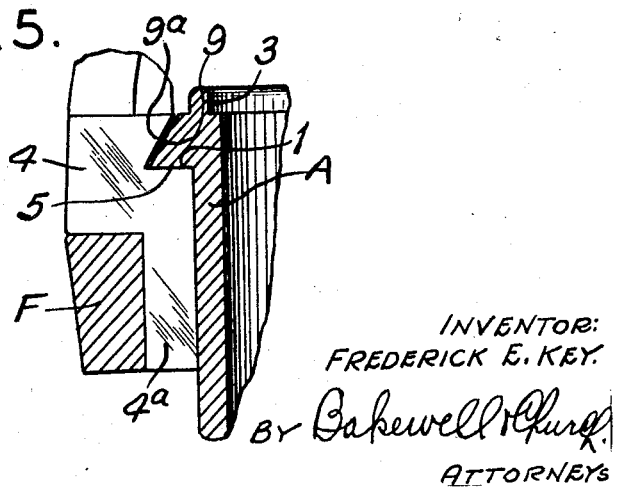
Fig. 5 is a detail sectional view, illustrating another way of constructing the tube ends and the tube shackles to interlock said parts together.

In order to eliminate the possibility of the housing, formed by the shackles C, from moving endwise of the tubes A when the tubular element B is not in operative position, I form the shackles in such a way that they are interlocked with the tubes and are securely held against movement endwise of the tubes in either direction, when the tubular element B is removed. In the form of my invention shown in Fig. 2, the tube surrounding portions 4 of the shackles are provided with inwardly-projecting ribs or flanges 8 that lap over the terminal ends of the tubes, and thus cause the flanged portions of the tubes to be confined between the shoulders 5 and the ribs 8 on the shackles. This interlocking engagement between the shackles and the upset or flanged ends of the tubes is made possible by reason of the fact that the shackles are split longitudinally or longitudinally-divided, whereby the two sections of the shackle may be easily applied to or removed from the flanged end of the tube when the tie bar F is not in operative position. After the tie bar F has been assembled with the shackles, it is impossible for the shackles to move longitudinally of the tubes in either direction when the tubular element B is removed and when the tubes are being cleaned. In Fig. 5 I have illustrated another way that the tube flanges and the tube surrounding portions 4 of the shackles may be formed to interlock said parts together and prevent the shackles from shifting endwise of the tubes when the tubular element B is disassociated from the tubes. As shown in said Fig. 5, each of the tubes A is provided at its end with a flanged or upset portion whose circumferential face is tapered at 9, and the opposed surface 9ª of the tube surrounding portion 4 of the shackle is also tapered, with the result that when the shackle is mounted on the tube, the shoulder 5 on the shackle will co-operate with the shoulder 1 on the tube to prevent the shackle from moving outwardly and the co-acting inclined surfaces 9 and 9ª on the tube and on the shackle will prevent the shackle from moving inwardly on the tube, thereby causing the shackle to be interlocked with the tube in practically the same way as in the form of my invention shown in Fig. 2. This feature or characteristic of my tube connecting device which eliminates the possibility of the shackles C moving endwise of the tubes during the operation of cleaning the tubes is of great value, as it effectively prevents carbon and other foreign matter from becoming deposited between the external shoulders 1 on the tubes and the co-acting surfaces on the shackles, during the operation of cleaning the tubes, and thus causing insecure joints or interfering with the operation of producing tight joints between the parts of the structure when the tubular element B is thereafter installed at the completion of the tube cleaning operation. In my improved tube connecting device the flanged or upset ends of the tubes are completely surrounded by portions of the shackles at all times, even when the tubular element B is removed, with the result that there is no chance of foreign matter collecting between the opposed portions of the tubes and shackles, as might occur if the shackles were capable of shifting inwardly on the tubes when the tubular element B is removed. Moreover, as previously explained, the tubes A are effectively held against spreading and the shackles C are held against twisting during the tube cleaning operation, both of which characteristics add greatly to the commercial utility of the device.

In prior tube connecting devices of this general type, the plates that carry the binding screws E are of such design or construction that they have no tendency to resist spreading of the portions of the housing in which said plates are positioned. In my improved connecting device the plates D have end portions that project laterally through elongated slots 6ª in the extensions or side arms 6 of the shackles, and the end portions of said plates are so shaped or formed that in the operation of tightening the binding screws E, the end portions of the plates D exert pressure on the extensions or side arms 6 of the shackles in a direction tending to prevent the opposed side arms of the shackles from spreading apart. This result can be attained in various ways, but I prefer to form inclined surfaces 10 on the end portions of the plates D and coacting inclined surfaces 10ª on the shackle side arms 6, disposed at such an angle that when the plates D move outwardly, or upwardly, looking at the drawings, due to tightening of the binding screws E, the end portions of said plates are disposed in overlapping relationship with the side arms 6 of the shackles, and thus effectively overcome any tendency for said side arms to spread.

The elongated slots 6ª constitute spaces in the outwardly extended portion of each shackle member increasing the elasticity of those portions of each shackle member that are at the sides of the slots in the respective shackle members, thus permitting said shackle members by the elasticity thereof under the influence of heat and variations in the degree of heat and the stress to which the shackle members are subjected when in use to compensate for variations in the temperature of the hot oil in the tubes A and tubular element B connecting and forming communication between said tubes. These slots 6ª may be made of any desired length to obtain the required degree of elasticity to compensate for the variations mentioned and thereby prevent leakage at the joints between the tubes A and the tubular element B.

Having thus described my invention, what I claim as new and desire to secure by Letters Patent is:

1. A connecting device for flanged or upset tubes, comprising a removable tubular element for establishing communication between two tubes, a housing mounted on the tubes and composed of two separate and distinct main parts or shackles, each of which comprises a sectional tube surrounding portion divided longitudinally and provided with an integral shoulder that bears against a shoulder on the tube which said portion surrounds, a retaining means for said tubular element carried by integral extensions on the sections of said tube surrounding portions, a transversely-disposed tie member having openings receiving and preventing the sections of said tube surrounding portions from separating and also prevents the two shackles from spreading, and means for maintaining said tie member in operative relationship with the mounted on said tubes, devices in connection with the outer ends of said housing members holding said tubular element in sealing contact with said two tubes, an element extending transversely of the axes of said tubes engaging and holding said housing members from spreading apart, and a device connected with said element located between and engaging and holding said housing members from twisting relatively.

12. A device for establishing communication between two adjacent approximately parallel tubes comprising a tubular element having its ends in sealing engagement with the ends of said tubes respectively, unattached housing members mounted on said tubes, devices in connection with the outer ends of said housing members holding said tubular element in sealing contact with said two tubes, an element extending transversely of the axes of said tubes engaging and holding said housing members from spreading apart, a device unattached to and mounted between and engaging and holding said housing members from twisting relatively, and means connecting said device with said element.

13. A device for maintaining communication between two adjacent approximately parallel tubular members comprising another tubular member, interengaging recesses and ribs on the ends of said tubular members forming a seal, unattached housing members mounted on said first tubular members, devices in connection with the outer ends of said housing members holding said other tubular member in sealing contact with said two tubular members, an element extending transversely of the axes of said first tubular members holding said first tubular members from spreading apart, a device unattached to and mounted between and engaging and holding said housing members from twisting relatively, and means connecting said device with said element.

14. A device for maintaining communication between two adjacent approximately parallel tubes comprising another tube having its ends disposed adjacent to the ends of said parallel tubes respectively, interengaging recesses and ribs on the ends of said tubes forming a leak-proof joint, sectional housing members mounted on each of said first tubes, devices connected with said housing members holding said other tube in sealing contact with said two tubes, an element extending transversely of the axes of said two parallel tubes preventing said two parallel tubes from spreading apart, and a device connected with said element engaging and holding said housing members from twisting relatively.

15. A device for maintaining communication between two adjacent approximately parallel tubes comprising another tube having its ends disposed adjacent to the ends of said parallel tubes respectively, interengaging recesses and ribs on the ends of said tubes forming a leak-proof joint, sectional housing members mounted on each of said first tubes, devices connected with said housing members holding said other tube in sealing contact with said two tubes, an element extending transversely of the axes of said two tubes holding said housing members in cooperative relation and preventing said two tubes from spreading apart, abutment portions on said housing members, and a device attached to said element and engaging said abutment portions and preventing said housing members from twisting relatively.

16. A device for maintaining communication between two adjacent approximately parallel tubes comprising another tube having its ends disposed adjacent to the ends of said parallel tubes respectively, interengaging recesses and ribs on the ends of said tubes forming a leak-proof joint, sectional housing members mounted on each of said first tubes, devices connected with said housing members holding said other tube in sealing contact with said two tubes, an element extending transversely of the axes of said two tubes holding said housing members in cooperative relation and preventing said two tubes from spreading apart, abutment portions on said housing members, a part mounted between said housing members adjacent to said abutment portions to prevent said housing members from twisting relatively, and means for connecting said part with said element.

17. A device establishing communication between adjacent ends of laterally spaced approximately parallel tubes having outwardly extended rigid shoulders near their ends, comprising an arcuate tubular element having its ends interlocked with and forming fluid-tight joints with the ends of said tubes, a device partially surrounding and extending outwardly from each tube and having a rib abutting against the inner wall of said shoulder on the adjacent tube and also having a shoulder spaced outwardly from said rib adapted to engage the outer wall of said shoulder on said tube, said ribs and said shoulders preventing said shackle members from sliding along said tubes, and clamping means supported by said devices holding said tubular element in position in which its ends are interlocked with and form fluid-tight joints with the ends of said tubes.

18. A connecting device for tubes comprising a tubular element having its ends interlocked with and forming fluid-tight joints with the ends of said tubes, circumferential shoulders on the end portions of said tubes, a device partially surrounding and extending outwardly from each tube and having grooves receiving said shoulders and provided with walls engaging said shoulders loosely and preventing longitudinal movement of said device along said tubes, detachable means preventing said devices from twisting, means securing said devices about said tubes, and clamping means supported by said devices holding said tubular element in position in which its ends are interlocked with and form fluid-tight joints with the ends of said tubes.

19. A device establishing communication between adjacent ends of laterally spaced approximately parallel tubes comprising a tubular element having its ends interlocked with and forming fluid-tight joints with the ends of said tubes, devices relatively unattached partially surrounding and interlocked with and extending outwardly from said tubes respectively, clamping means engaging said devices and holding said tubular element with its ends interlocked with and forming fluid-tight joints with the ends of said tubes, spaced abutment walls on said devices inwardly from said tubular element, and a member supported other than by said tubular element mounted between and adapted to be engaged by said abutment walls to prevent said devices from twisting.

20. A device establishing communication between adjacent ends of laterally spaced approximately parallel tubes comprising a tubular element having its ends interlocked with and forming fluid-tight joints with the ends of said tubes, devices relatively unattached partially surrounding and interlocked with and extending outwardly from said tubes respectively, clamping means engaging said devices and holding said tubular element with its ends interlocked with and forming fluid-tight joints with the ends of said tubes, spaced abutment walls on said devices inwardly from said tubular element, a member mounted between and adapted to be engaged by said abutment walls to prevent said devices from twisting, and means holding said devices interlocked with said tubes and supporting said member in position between said abutment walls.

21. A tube connecting device comprising a removable tubular element for establishing communication between two tubes, housing members mounted on the tubes, devices in connection with said housing members for holding said tubular element in position to establish communication between said two tubes, a tie bar engaging and holding said housing members in cooperative relation to said tubes, opposed abutment walls on said housing members, an adapter mounted on said tie bar and engaging said walls to hold said housing members from twisting, and a fastener having detachable engagement with said tie bar holding said adapter in connection therewith.

FREDERICK E. KEY.